United States Patent
Durand et al.

(10) Patent No.: US 11,064,711 B2
(45) Date of Patent: Jul. 20, 2021

(54) CLOSURES FOR LIQUID-DISPENSING CONTAINERS AND METHODS FOR MAKING AND USING SUCH CLOSURES

(71) Applicant: NESTEC S.A., Vevey (CH)

(72) Inventors: Cyrille Durand, Arcadia, CA (US);
Rawan Friel, Philadelphia, PA (US);
Jesse Hartman, Mequon, WI (US);
Terry Parve, Mequon, WI (US)

(73) Assignee: Societe des Produits Nestle S.A., Vevey (CH)

( * ) Notice: Subject to any disclaimer, the term of this patent is extended or adjusted under 35 U.S.C. 154(b) by 275 days.

(21) Appl. No.: 14/837,905

(22) Filed: Aug. 27, 2015

(65) Prior Publication Data

US 2017/0057708 A1    Mar. 2, 2017

(51) Int. Cl.
*A23F 5/24* (2006.01)
*B65D 47/08* (2006.01)

(52) U.S. Cl.
CPC ............ *A23F 5/24* (2013.01); *B65D 47/0809* (2013.01); *B65D 2251/20* (2013.01)

(58) Field of Classification Search
CPC . B65D 1/02; B65D 1/00; B65D 65/00; B65D 43/14; B65D 43/162; B65D 43/16; B65D 51/00; B65D 25/40; B65D 47/00; B65D 47/06; B65D 47/08; B65D 47/2006; B65D 51/04; B65D 51/10; B65D 47/0857; B65D 41/0442; B65D 85/80; B65D 47/0809; B65D 2251/20; F16F 1/34; F16F 1/36; B65B 7/28; A23F 5/24

USPC ..... 215/289, 235, 236, 339, 387; 220/254.3, 220/703; 426/529, 120; 222/160, 108, 222/109, 546, 563, 556, 129, 145.1, 478
See application file for complete search history.

(56) References Cited

U.S. PATENT DOCUMENTS

| | | | | |
|---|---|---|---|---|
| 5,395,015 A | * | 3/1995 | Bolen, Jr. | B65D 47/0885 |
| | | | | 215/235 |
| 6,367,670 B1 | * | 4/2002 | Warner | B65D 47/0804 |
| | | | | 222/556 |
| 2005/0242095 A1 | * | 11/2005 | Serrano | B65D 55/16 |
| | | | | 220/254.3 |

(Continued)

OTHER PUBLICATIONS

Kailani. "Coffee-Mate Natural Bliss Liquid Coffee Creamer—Part II." An Island Life Hawaii Mom Blog. May 23, 2012. <http://islandlife808.com/tag/natrual-coffee-creamer/>. Accessed Jan. 13, 2017.*

*Primary Examiner* — Ericson M Lachica
(74) *Attorney, Agent, or Firm* — K&L Gates LLP

(57) ABSTRACT

A closure can include a base having an opening. The base can be connected to a container such that a liquid in the container, for example a creamer, is pourable through the opening of the closure into a beverage cup. The closure can include an overcap having a plug, and the plug can seal the opening when the overcap is in a closed position relative to the base. A hinge can connect the overcap to the base and be biased to establish and maintain an angle of the overcap when the overcap moves out of the closed position. Liquid retained on the overcap during opening of the overcap can then fall directly into the beverage cup during pouring due to the angle of the overcap in the open position. Any retained liquid ingredient that falls from the overcap onto the base can be confined within a ring on the base.

11 Claims, 7 Drawing Sheets

(56) References Cited

U.S. PATENT DOCUMENTS

| | | | |
|---|---|---|---|
| 2009/0134188 A1* | 5/2009 | Wilson | B65D 47/0809 222/571 |
| 2009/0242564 A1* | 10/2009 | Danks | B65D 47/0838 220/361 |
| 2012/0000944 A1* | 1/2012 | Romanov | B05B 1/042 222/556 |
| 2012/0074180 A1* | 3/2012 | Kallenbach | B65D 47/06 222/567 |
| 2012/0104052 A1* | 5/2012 | Offord | B65D 47/2006 222/498 |
| 2015/0217910 A1* | 8/2015 | Vogel | B65D 47/40 222/109 |

* cited by examiner

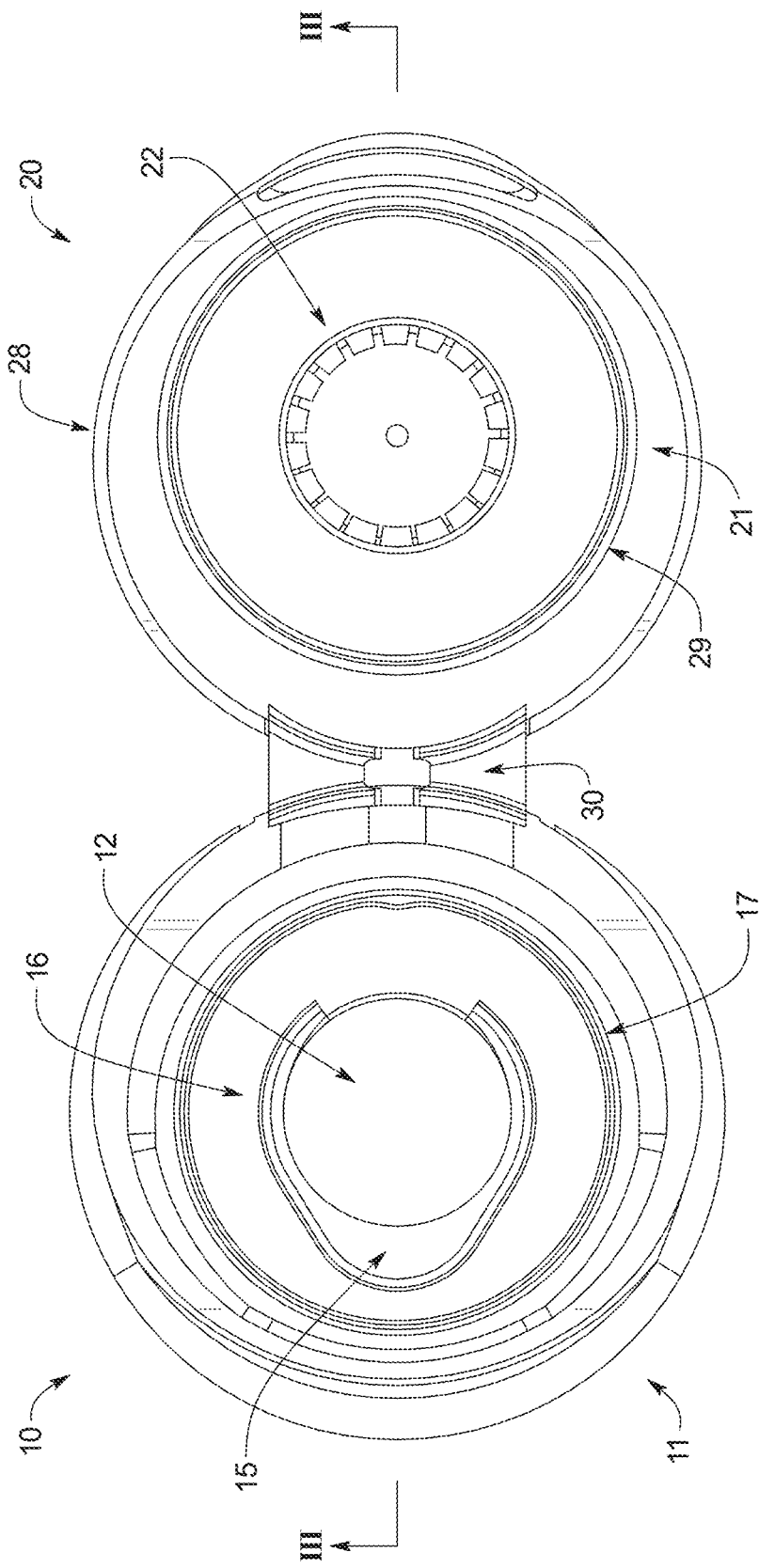

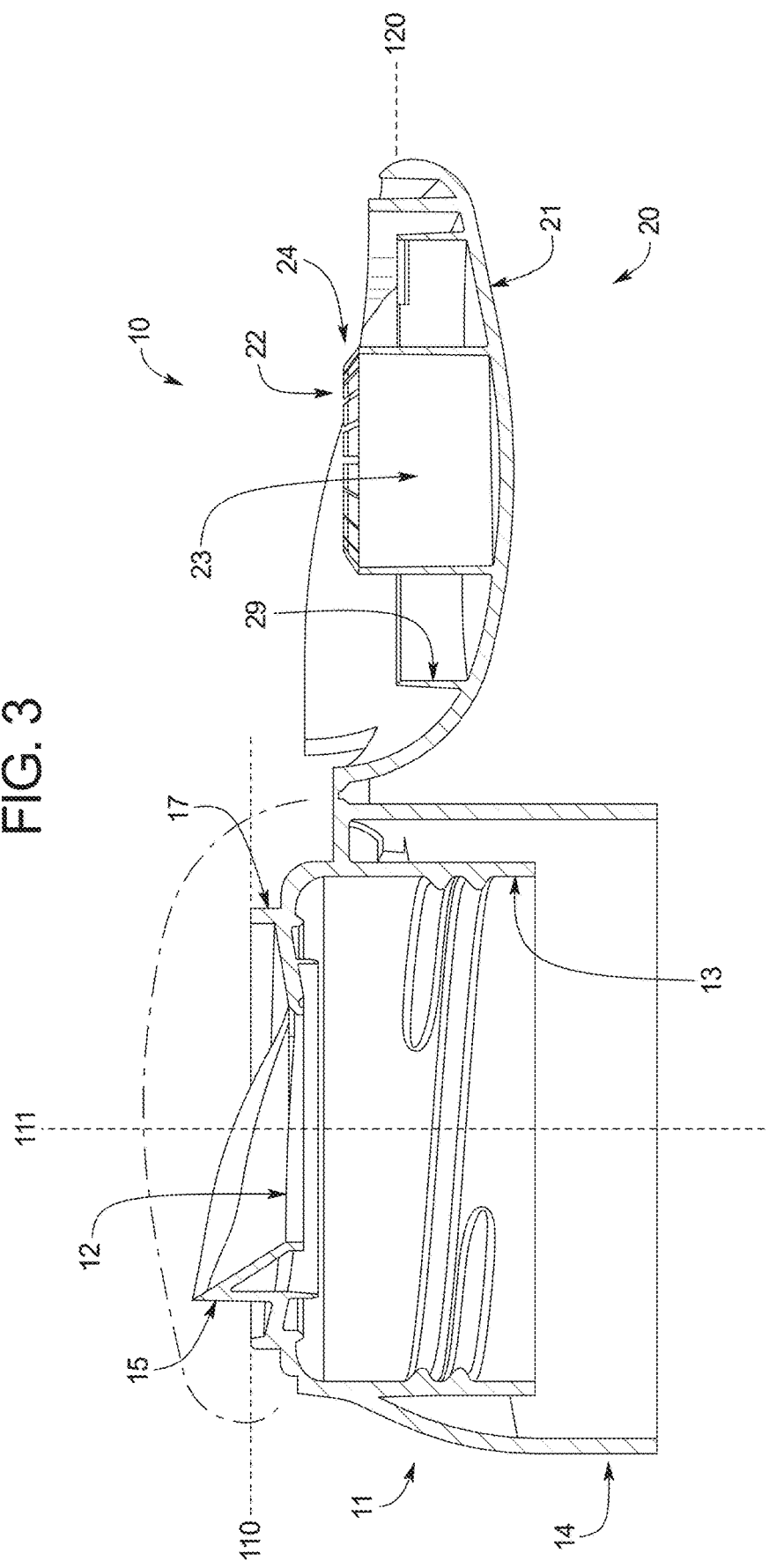

FIG. 8

| Testing Method | | | Shake, Open & Pour | | | | |
|---|---|---|---|---|---|---|---|
| Defect | | | Dripping from Plug | | | | |
| Dosing Level | | | Zero pour | | | | |
| Fill Level | | Full | Full | 3/4 Full | 1/2 Full | 1/4 Full |
| Cavity 1 | 28% | 30% | 20% | 30% | 0% |
| Cavity 2 | 32% | 40% | 20% | 0% | 20% |
| 2 Unit Average | 30% | 60% | 20% | 15% | 10% |
| Control | 32% | 20% | 50% | 80% | 90% |

_US 11,064,711 B2_

CLOSURES FOR LIQUID-DISPENSING CONTAINERS AND METHODS FOR MAKING AND USING SUCH CLOSURES

BACKGROUND

The present disclosure relates generally to closures for containers in which a liquid such as a coffee creamer is held and dispensed from the container. More specifically, the present disclosure is directed to container closures that comprise a hinged overcap, and the closures direct and/or confine liquid dripping from the overcap.

Bottles for dispensing a liquid such as a coffee creamer are typically closed by an overcap which enables a convenient pouring of the liquid into a beverage cup. Before pouring, the consumer shakes the bottle with the overcap closed, opens the overcap, and then pours the shaken liquid into a beverage cup.

However, the shaking of the bottle typically positions some of the liquid on the overcap. This liquid is retained on the overcap when the overcap is opened, and then this liquid is dripping from the overcap as the consumer pours the liquid from the bottle into the beverage cup. This dripping can create undesirable drops and puddles of the liquid on the top of the bottle. Furthermore, this liquid on top of the bottle can be pushed around when the overcap is closed onto the top of the bottle after pouring is completed, creating further messiness on the bottle.

SUMMARY

The present disclosure provides a closure that can significantly reduce the mess from dripping product by directing any dripping product toward the beverage cup. In this regard, at least a portion of any dripping product can fall into the cup instead of falling onto the base of the closure. Occasionally, a portion of the dripping product can fall onto the base of the closure, especially when the bottle is full, but the closure can comprise an outer ring that prevents product fallen on the base from flowing out from the upper base. Thus any mess can be confined within the outer ring. Without the outer ring, the product would flow toward the side of the closure, contributing in more product mess.

Specifically, the angle of the hinge connecting the overcap to the base of the closure can be designed so that any product dripping from the overcap is directed into the beverage cup whether the bottle is full, empty, or has a volume therebetween. When the bottle is full or almost full, the angle of the bottle is such that dripping from the overcap may be directed to the base of the closure. For other volumes, such as ¾ full to empty, dripping may be directed into the cup.

Accordingly, in a general embodiment, the present disclosure provides a closure comprising: a base comprising a first surface comprising an opening, the base configured to be connected to a container such that a liquid in the container is pourable from the container through the opening, and the first surface defines a plane of the base; an overcap comprising a body and a plug, the plug is sized and shaped to seal the opening when the overcap is in a closed position relative to the base, and the plug extends from the body in a main extension direction to which a plane of the overcap is perpendicular; and a hinge that connects the overcap to the base and is biased to maintain an open position of the overcap relative to the base, and the plane of the overcap is angled at 125 degrees to 145 degrees relative to the plane of the base when the overcap is in the open position.

In an embodiment, the first surface of the base further comprises a ring configured to retain a liquid on a section of the first surface that is within the ring. The ring can be perpendicular to the plane of the base. The base can comprise a spout extending from the first surface along at least a portion of a perimeter of the opening, and the ring circumscribes the spout. The base can comprise a connecting wall configured to connect the base to the container, and the connecting wall extends from an opposite side of the first surface relative to the ring. The base can comprise a skirt that circumscribes the connecting wall. The connecting wall can comprise threads.

In an embodiment, an end of the plug opposite from the body of the overcap is a tapered end such that a diameter of the end of the plug opposite from the body has a diameter smaller than a diameter of a section of the plug between the tapered end and the body, and the tapered end comprises an aperture that extends into the plug.

In an embodiment, the plane of the overcap is angled at about 135 degrees relative to the plane of the base when the overcap is in the open position.

In another embodiment provided by the present disclosure, a package comprises: a container housing a liquid; and a closure comprising a base comprising a first surface comprising an opening, the base connected to the container such that the liquid in the container is pourable from the container through the opening, and the first surface defines a plane of the base; an overcap comprising a body and a plug, the plug is sized and shaped to seal the opening when the overcap is in a closed position relative to the base, and the plug extends from the body in a main extension direction to which a plane of the overcap is perpendicular; and a hinge that connects the overcap to the base and is biased to maintain an open position of the overcap relative to the base, and the plane of the overcap is angled at 125 degrees to 145 degrees relative to the plane of the base when the overcap is in the open position.

In an embodiment, the liquid is a coffee creamer.

In an embodiment, the package comprises a fitment that connects the base of the closure to the container.

In another embodiment, the present disclosure provides a method of making a beverage using a container that houses a liquid ingredient of the beverage. The method comprising pouring the liquid ingredient from the container into a cup, the liquid ingredient is poured through an opening in a base of a closure connected to the container, the closure comprising an overcap connected to the base of the closure by a hinge, and the hinge maintains the overcap in a position such that drips of the liquid ingredient falling from the overcap land in the cup when the container is between ¼ and ¾ full and land within a ring extending from the base of the closure when the container is at least ¾ full.

In an embodiment, the base comprises a first surface comprising the opening and defining a plane of the base, the overcap comprises a plug configured to insert into and seal the opening, the plug extends from the body in a main extension direction to which a plane of the overcap is perpendicular, and the hinge maintains the plane of the overcap at 125 degrees to 145 degrees relative to the plane of the base.

In an embodiment, the method comprises shaking the container while the overcap is in a closed position covering the opening in the base, and then moving the overcap from the closed position to an open position in which the opening in the base is uncovered, before the pouring of the liquid ingredient. The overcap can comprise a plug configured to insert into and seal the opening, the plug can retain a portion of the liquid ingredient thereon during the moving of the overcap to the open position, and the portion of the liquid ingredient retained by the plug can form the drips of the liquid ingredient falling from the overcap.

In an embodiment, the cup contains a coffee, the liquid ingredient is a liquid creamer, and the beverage comprises the coffee and the creamer.

In an embodiment, the ring is configured to confine the drips of the liquid ingredient on the base.

In an embodiment, the ring circumscribes a spout which directs the liquid ingredient poured through the opening into the cup.

In another embodiment, the present disclosure provides a method of making a closure for a container that houses and dispenses a liquid, the method comprising: connecting an overcap to a base by a hinge, the closure comprises the overcap, the base and the hinge, the overcap comprises a first surface comprising an opening and defining a plane of the base, the overcap comprises a body and a plug, the plug is sized and shaped to seal the opening when the overcap is in a closed position relative to the base, the plug extends from the body in a main extension direction to which a plane of the overcap is perpendicular, and the hinge is biased such that an angle of the plane of the overcap is positioned at 125 degrees to 145 degrees relative to the plane of the base when the overcap is in an open position relative to the base; and forming a ring on the base, and the ring is configured to retain drops of liquid that have fallen from the overcap onto the base.

In an embodiment, the method comprises connecting the closure to the container. The method can comprise adding at least a portion of the liquid to the container before the connecting of the closure to the container.

Additional features and advantages are described herein and will be apparent from the following Detailed Description and the Figures.

BRIEF DESCRIPTION OF THE FIGURES

FIG. 2 shows a side plan view of an embodiment of a closure provided by the present disclosure.

FIG. 3 shows an above plan view of an embodiment of a closure provided by the present disclosure.

FIG. 8 is a chart showing results from a laboratory study disclosed herein.

DETAILED DESCRIPTION

Figure 1:
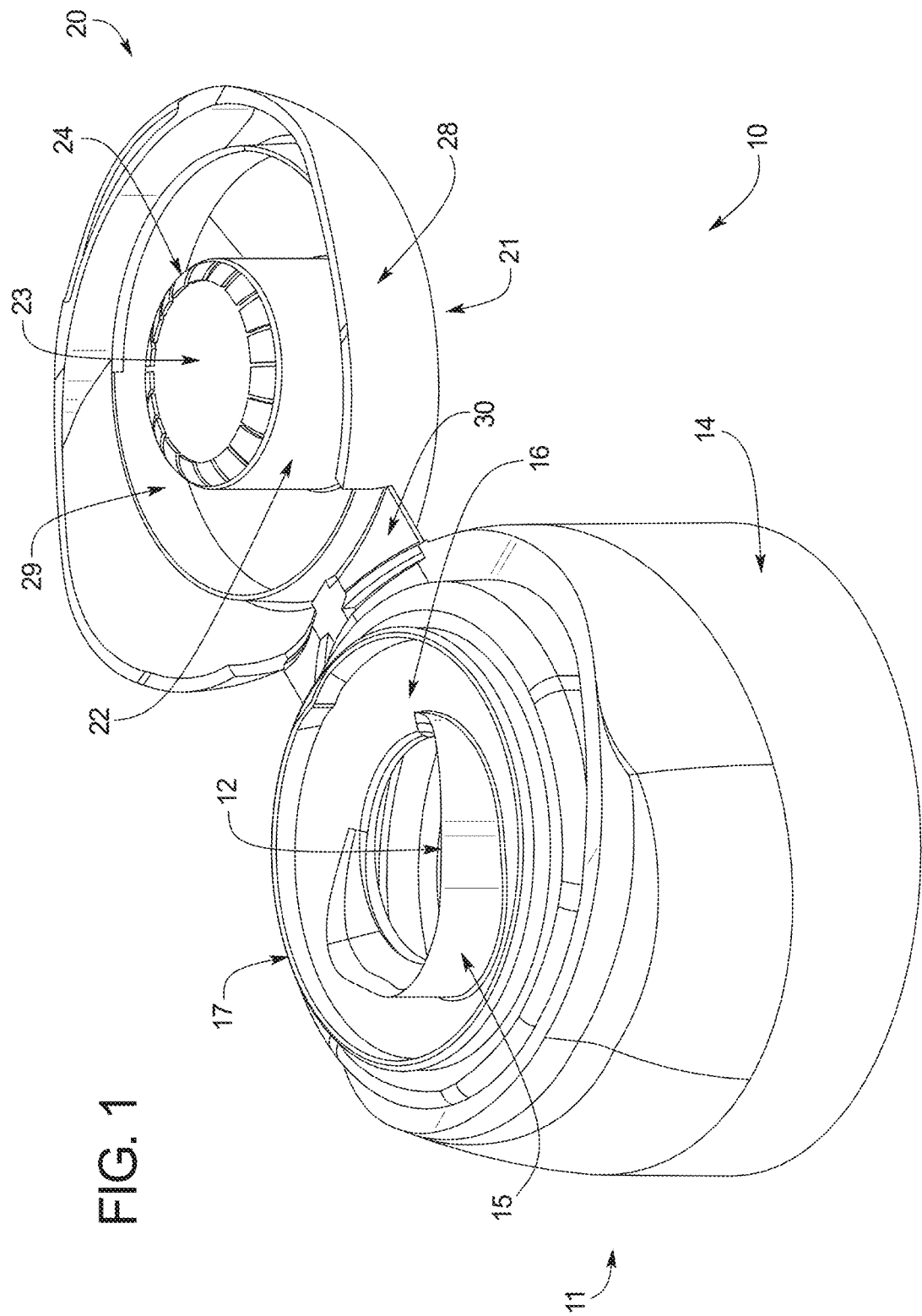
FIG. 1 shows a side perspective view of an embodiment of a closure provided by the present disclosure.

As used in this disclosure and the appended claims, the singular forms "a," "an" and "the" include plural referents unless the context clearly dictates otherwise. Thus, for example, reference to "a liquid" or "the liquid" includes two or more liquids.

The words "comprise," "comprises" and "comprising" are to be interpreted inclusively rather than exclusively. Likewise, the terms "include," "including" and "or" should all be construed to be inclusive, unless such a construction is clearly prohibited from the context.

However, the devices and apparatuses disclosed herein may lack any element that is not specifically disclosed. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified.

The term "and/or" used in the context of "X and/or Y" should be interpreted as "X," or "Y," or "X and Y." Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly stated otherwise.

As used herein, "about" and "approximately" are understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number.

In the context of this disclosure, a "creamer" means a composition that can be used as a milk substitute, preferably comprising one or more components such as proteins, for example non-fat milk solids, caseins and/or derivatives thereof; carbohydrates, for example corn syrup, sucrose, dextrose, fructose, maltodextrin, lactose and/or an artificial sweetener; and/or fats or vegetable oils. The creamer components may be derived from milk; for example, the creamer may contain milk powder.

As used herein, a "container" is any device comprising an at least partially enclosed interior capable of holding a liquid and comprising an opening that can dispense the liquid from the interior. Non-limiting examples of suitable containers include bottles and jars.

The terms "connect" and "attach" in the disclosure and the claims do not require direct connection or attachment and encompass indirect connections and attachments that include one or more intermediate pieces that connect or attach the referenced components. As used herein, "reversibly removable" mean that the referenced components can be connected to and removed from each other without damaging any of the referenced components and without damaging a connector, if any.

As shown in FIGS. 1-3, an aspect of the present disclosure is a closure 10 comprising a base 11 connected to an overcap 20 by a hinge 30. The base 11 can comprise an opening 12. The hinge 30 can allow the overcap 20 to pivot relative to the base 11, for example between a closed position in which the overcap 20 covers the opening 12 (shown by dotted lines in FIG. 3) and an open position in which the opening 12 is not covered by the overcap 20 (shown in FIGS. 1-3). The opening 12 can extend through the base 11 such that the closure 10 can be connected to a container that houses a liquid, and the liquid can be poured through the opening 12 when the overcap 20 is in the open position.

The overcap 20 can comprise a body 21 that may form an outer surface of the overcap 20, and the overcap 20 can comprise a plug 22 that may extend from the body 21. The plug 22 can be configured to insert into the opening 12 and seal the opening 12 when the overcap 20 is in the closed position. For example, a perimeter of the plug 22 and a perimeter of the opening 12 can have approximately the same shape and approximately the same circumference. Thus the plug 22 can be reversibly removable from the opening 12. A friction fit between the plug 22 and the opening 22 can hold the plug 22 in the opening 12. In some embodiments, the friction fit maintains the overcap 20 in the closed position relative to the base 11.

In a preferred embodiment, the plug 22 is hollow such that there is an aperture 23 in the distal end of the plug 22 (e.g., the end of the plug 22 distanced from the body 21), and the aperture 23 can extend into the plug 22 at least a majority of the length of the plug 22, for example approximately the entirety of the length of the plug 22. The aperture 23 can have approximately the same shape as the plug 22 and preferably has a diameter slightly less than the outer diameter of the plug 22, for example a diameter that is at least 80%, at least 90% or at least 95% of the outer diameter of the plug 22. The plug 22 and the aperture 23 therein preferably have the same axis of symmetry.

The base 11 of the closure 10 preferably comprises a connecting wall 13 (e.g., a cylindrical wall) that can connect the closure 10 to a neck of a container. For example, the connecting wall 13 can be cylindrical and can comprise threads that engage complementary threads on the neck of the container. In an embodiment, the connecting wall 13 has about the same size and about the same shape as the neck of the container. The body of the closure 10 preferably comprises a skirt 14 that can circumscribe the connecting wall 13 and can abut the body of the container, preferably below the neck of the container (e.g., the skirt 14 can extend farther than the connecting wall 13).

Preferably the distal end of the plug 22 comprises a tapered portion 24 that is tapered inward such that the circumference of the distal end of the plug 22 is smaller than the circumference of the section of the plug 22 between the tapered portion 24 and the body 21. In an embodiment, the circumference of the plug 22 is approximately the same along the entirety of the length of the section between the tapered portion 24 and the body 21. Although the figures show the plug 22 as cylindrical and the opening 12 as circular, any shape can be used. The term "circumference" merely means the distance along the perimeter and does not imply that the plug 22 and the opening 12 must be cylindrical and circular respectively. The closure 10 is not limited to a specific shape of any of its components, such as the opening 12 or the plug 22.

The base 11 preferably comprises a spout 15 that can be positioned along at least a portion of the perimeter of the opening 12, preferably along at least 50% of the perimeter of the opening 12, more preferably along at least 60% of the perimeter of the opening 12, most preferably along at least 70% of the perimeter of the opening 12. The base 11 can comprise an first surface 16 (e.g., an upward-facing planar surface) in which the opening 12 can be positioned, and the spout 15 can be a wall extending from the first surface 16 of the base 11. The spout 15 can have a varying height; for example, the height of the spout 15 is preferably largest on the side of the spout 15 that faces away from the hinge 30.

When the overcap 20 is in the closed position, the body 21 of the overcap 20 can abut the base 11 of the closure 10 to form a continuous surface with the base 11 such that there are no gaps between the overcap 20 and the base 11. For example, the body 21 of the overcap 20 can comprise an outer wall 28 that can abut at least a portion of the first surface 16 and/or at least a portion of the skirt 14 when the overcap 20 is in the closed position. Additionally or alternatively, the overcap 20 can comprise an inner wall 29 that can abut at least a portion of the first surface 16 and/or at least a portion of the skirt 14 when the overcap 20 is in the closed position. The outer wall 28 and/or the inner wall 29 can circumscribe the plug 22.

In a preferred embodiment, the base 11 of the closure 10 comprises a ring 17 that can extend upward from the first surface 16 and can circumscribe the opening 12 and/or the spout 15. The ring 17 can be configured to confine any liquid dripping onto the base 11 from the overcap 20, such as any liquid dripping onto the first surface 16 from the plug 22. A gap is optionally formed between the ring 17 and the inner wall 29 when the overcap 20 is in the closed position such that the ring 17 does not abut the inner wall 29, although in some embodiments the ring 17 abuts the inner wall 29 when the overcap 20 is in the closed position.

Figure 5:
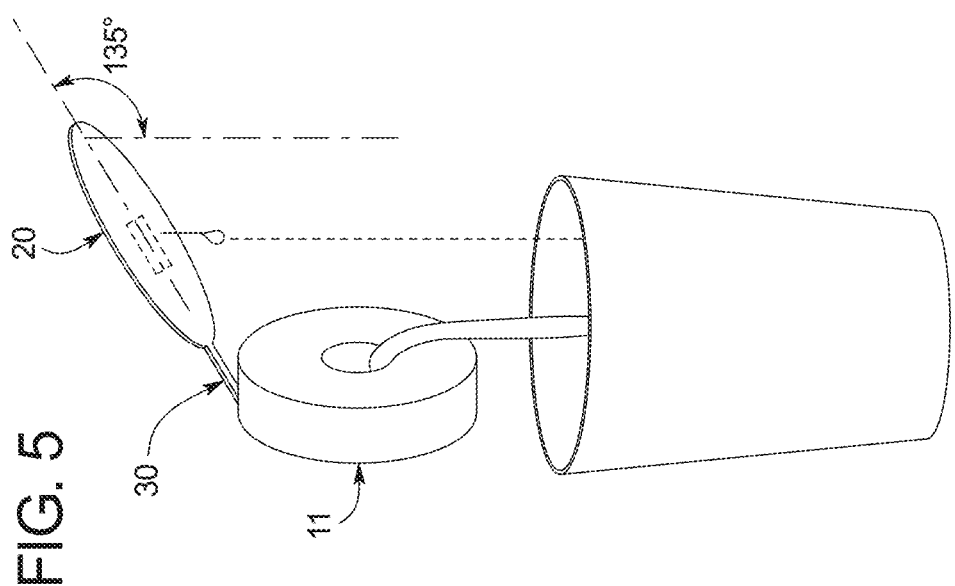
FIG. 5 shows pouring of liquid product using an embodiment of a closure provided by the present disclosure.
Figure 4:
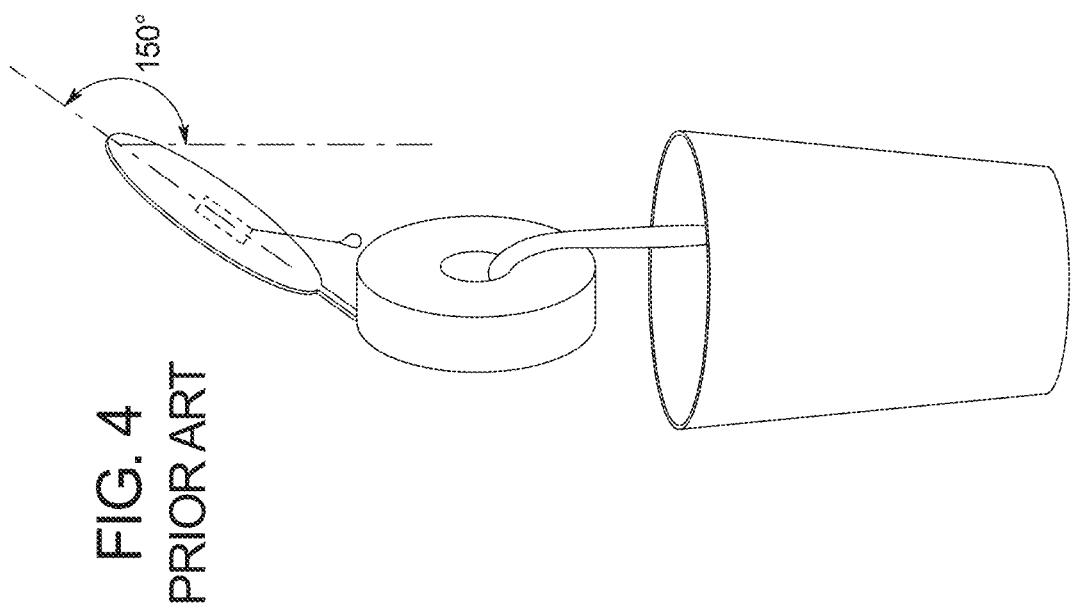
FIG. 4 shows pouring of liquid product using prior art closures.

As shown in FIG. 4, known closures typically have an overcap that has an angle of 150 degrees relative to the vertical axis of the beverage cup (the vertical axis of the beverage cup is typically approximately perpendicular to the central axis of the container when the container is ¼ to ¾ full). As a result, these known closures drip liquid product from the overcap to the base of the closure, thereby creating drops and puddles of liquid product on the base. In contrast, a preferred embodiment of the closure 10 provided by the present disclosure is configured such that, during pouring from a container that is ¼ to ¾ full, at least a portion of any liquid dripping from the overcap 20 is directed to the beverage cup below, as shown in FIG. 5.

For example, when the overcap 22 is moved out of the closed position in which the plug is inserted into the opening 12, the hinge 30 can be configured to establish and maintain an angle of the plane 120 of the overcap 20 at 125 degrees to 145 degrees (e.g., about 135 degrees) relative to the vertical axis of the beverage cup and/or the plane 110 of the base 11. Preferably, the hinge 30 is biased toward this angle. In an embodiment, the plane 120 of the overcap 20 is a plane perpendicular to the main extension direction of the plug 22, a plane perpendicular to the inner wall 29, and/or a plane perpendicular to the outer wall 28. In an embodiment, the plane 110 of the base 11 is a plane defined by the first surface 16 of the base 11. In an embodiment, the plane 110 of the base 11 is a plane perpendicular to the central axis 111 of the base 11. The central axis 111 of the base 11 can be an axis about which the connecting wall 13 is symmetrical, and/or the central axis 111 of the base 11 can be a virtual line extending through at least two of the following: the center of the skirt 14, the center of the connecting wall 13, the center of the opening 12, the center of the first surface 16, and the center of the ring 17. The "center" is the point from which approximately all of a virtual circle overlapped by the referenced component is approximately equidistant.

In an embodiment, the hinge 30 is a single planar piece of resilient plastic that deforms to enable the overcap 20 to achieve the closed position in which the plug 22 inserts into the opening 12. The insertion of the plug 22 into the opening can hold the overcap 20 in the closed position. When the overcap 20 is moved away from the base 11 and the plug 22 is thereby removed from the opening 12, the hinge 30 can be biased toward the position in which the plane 120 of the overcap 20 is 125 degrees to 145 degrees (e.g., about 135 degrees) relative to the plane 110 of the base 11.

Figure 6:
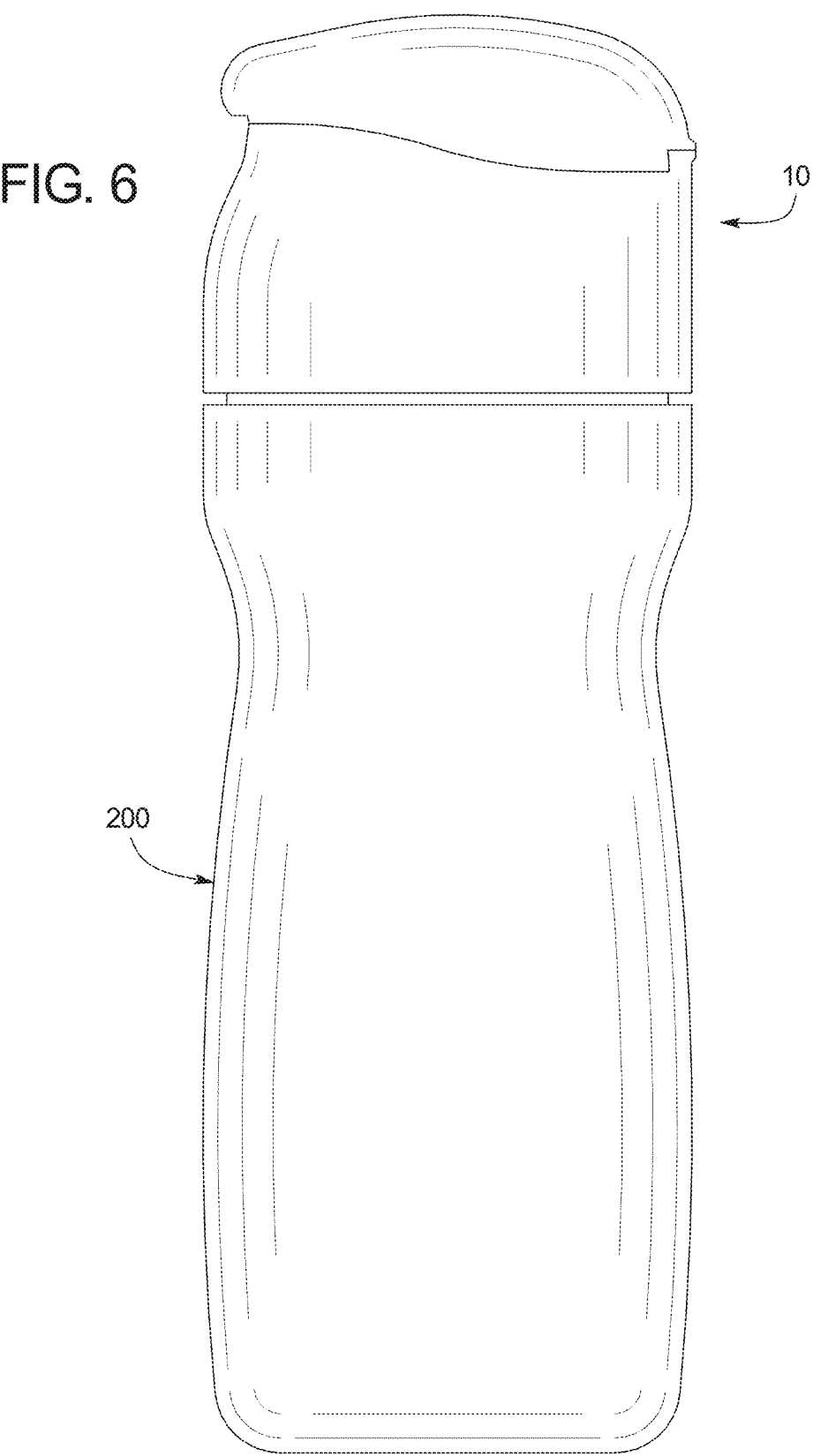
FIG. 6 shows a side plan view of a container connected to an embodiment of a closure provided by the present disclosure.
Figure 7:
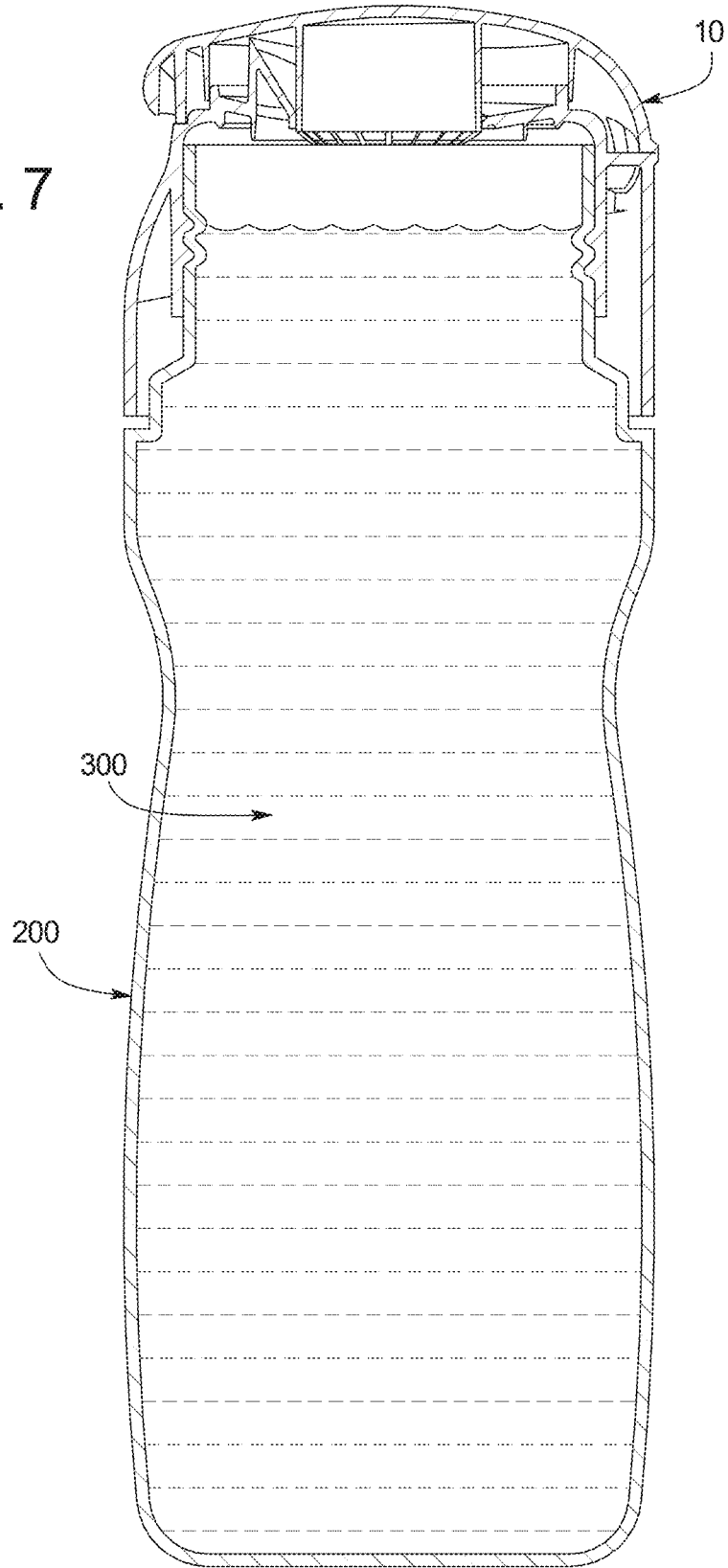
FIG. 7 shows a side cross-section view of a container connected to an embodiment of a closure provided by the present disclosure.

In another aspect of the present disclosure, a package comprises a container 200 and the closure 10, and the closure 10 is connected to the container 200 (FIGS. 6 and 7). The container 200 can contain a liquid product 300, for example a coffee creamer.

In a preferred embodiment, the closure 10 is connected to the container 200 indirectly, for example by a fitment. One way of manufacturing such an embodiment is to attach the fitment to the neck of the container 200 and then attach the closure 10 to the fitment, for example by screwing the closure 10 (e.g., the base 11) onto the fitment. After the tab is pulled, the fitment preferably has no impact on the pouring functionality of the closure 10 and preferably does not provide any interference with the liquid product 300 poured from the closure 10. For example, the fitment may be positioned substantially underneath the closure 10 when the container 200 is in an upright position, preferably completely underneath the closure 10, such that the fitment does not enter the flow path of the liquid product 300 during pouring thereof. Further in this regard, in some embodiments the circumference of the fitment is at most about equal to the circumference of the base 11 of the closure 10, such that the fitment does not extend outward beyond the base 11.

In yet another aspect, the present disclosure provides a method of making a beverage using a container that houses a liquid ingredient of the beverage. The method can comprise pouring the liquid ingredient from the container into the cup, and the liquid ingredient is poured through an opening in a base of a closure connected to the container. The cup is preferably approximately directly underneath the opening. The closure comprises an overcap connected to the base of the closure by a hinge, and the hinge maintains the overcap in a position such that drips of the liquid ingredient falling from the overcap land in the cup. For example, the hinge can maintain an angle of the plane of the overcap at 125 degrees to 145 degrees (e.g., about 135 degrees) relative to the plane of the base and/or, if the container is ¼ to ¾ full, at 125 degrees to 145 degrees (e.g., about 135 degrees) relative to the vertical axis of the cup. Preferably the angle is maintained for the entirety of the pouring, for example about one to three seconds. The method can use any embodiment of the closure 10 disclosed herein or any other closure capable of performing the steps of the method.

In an embodiment, the method comprises shaking the container and then moving the overcap from a closed position relative to the base to an open position relative to the base, before the pouring. Some of the liquid ingredient can be retained on the overcap after moving the overcap to the open position (e.g., liquid ingredient retained by a plug seal of the overcap), and the method can comprise directing into the beverage cup at least a portion of the liquid ingredient that has been retained on the overcap and is dripping from the overcap.

In an embodiment, the method can comprise restricting flow of the ingredient which has dripped onto the base of the closure, and the base of the closure comprises a ring that restricts the flow of the ingredient which has dripped onto the base of the closure. For example, when the container is ¾ full or more, the angle of the container for pouring may position the overcap over the base of the closure despite the angle of the overcap established and maintained by the hinge. The liquid ingredient may drip from the overcap onto the base of the closure in this situation, and the ring on the base of the closure can confine these drips of the liquid ingredient.

In an embodiment of the method, the ingredient is poured from the container into a cup which contains a coffee, the ingredient is a liquid creamer, and the beverage comprises the coffee and the creamer. The container is preferably shaken before the opening of the overcap and/or before the pouring of the liquid ingredient.

In yet another aspect, the present disclosure provides a method of making a closure for a container that houses a liquid. The method can comprise connecting an overcap to a base with a hinge, and the hinge is configured such that a majority of the drips of the liquid from the overcap fall into a cup below the closure. For example, the hinge can be biased such that an angle of the plane of the overcap is positioned at 125 degrees to 145 degrees (e.g., about 135 degrees) relative to the plane of the base when the overcap is in an open position relative to the base. The method can comprise forming a ring on the base, and the ring can be configured to confine drops of liquid that have fallen onto the base from the overcap (e.g., from the plug). The method can form any embodiment of the closure 10 disclosed herein or any other closure capable of being formed by the steps of the method.

The method can comprise connecting the closure to the container. In an embodiment, the method comprises adding a liquid beverage ingredient to the container, preferably by adding at least a portion of the liquid beverage ingredient to the container before connecting the closure to the container.

Example

This non-limiting example details a laboratory study using containers housing liquid creamer and having an embodiment of the closure disclosed herein. Control containers having commercially available closures were used as well. The containers were shaken and opened, and two ounces of liquid creamer were poured for each sample. The bottles were tested at full volume, ¾ volume, ½ volume, and ¼ volume. For each sample, it was recorded whether liquid creamer was flinged from the overcap and also whether a drip ended up on the cap or bottle. Liquid creamer that dripped from the overcap into the beverage cup was noted but not categorized as a defect. The results are shown in FIG. 8 and demonstrate that the closure disclosed herein can significantly reduce the mess from dripping product by directing any dripping product toward the beverage cup.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of making a beverage using a container that houses liquid creamer, the method comprising pouring the liquid creamer from the container into a cup, the liquid creamer is poured through an opening in a base of a closure connected to the container, the container and the closure form a package, an upper planar surface of the base defines the opening, and the opening directly connects an interior of the package to an exterior of the package, the closure comprising a ring extending from the base, the closure further comprising an overcap connected to the base of the closure by a hinge, and the hinge is located on an opposite side of the base from the cup when the liquid creamer is poured from the container into the cup and maintains the overcap in a position such that drips of the liquid creamer falling from the overcap land in the cup when the container is between ¼ and ¾ full and the overcap is at 125 degrees to 145 degrees relative to a vertical axis of the cup during pouring, and land within the ring when the container is greater than ¾ full and the overcap is at an angle greater than 145 degrees to the vertical axis of the cup during pouring.

2. The method of claim 1 wherein the overcap comprises a plug configured to insert into and seal the opening, the plug extends from a body of the overcap in a main extension direction to which a plane of the overcap is perpendicular, and the hinge maintains the plane of the overcap at 125 degrees to 145 degrees relative to the upper planar surface of the base when the overcap is in an open position.

3. The method of claim 1 comprising shaking the container while the overcap is in a closed position covering the opening in the base, and then moving the overcap from the closed position to an open position in which the opening in the base is uncovered, before the pouring of the liquid creamer.

4. The method of claim 3 wherein the overcap comprises a plug configured to insert into and seal the opening, the plug retains a portion of the liquid creamer thereon during the moving of the overcap to the open position, and the portion of the liquid ingredient retained by the plug forms the drips of the liquid ingredient falling from the overcap.

5. The method of claim 1 wherein the cup contains a coffee, and the beverage comprises the coffee and the liquid creamer.

6. The method of claim 1 wherein the ring is configured to confine the drips of the liquid creamer on the base.

7. The method of claim 1 wherein the ring circumscribes a spout which directs the liquid creamer poured through the opening into the cup.

8. The method of claim 7, wherein the spout circumscribes the opening only partially.

9. The method of claim 7, wherein the spout fully circumscribes the opening.

10. The method of claim 1, wherein the angle is maintained for the entirety of the pouring.

11. The method of claim 10, wherein the pouring lasts for a period of time of 1 to 3 seconds.

* * * * *